US012684516B2

(12) United States Patent
Fukui

(10) Patent No.: US 12,684,516 B2
(45) Date of Patent: Jul. 14, 2026

(54) COMMUNICATION SYSTEM, COMMUNICATION CONTROL APPARATUS, AND COMMUNICATION CONTROL METHOD

(71) Applicant: NEC Corporation, Tokyo (JP)

(72) Inventor: Keiji Fukui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 391 days.

(21) Appl. No.: 18/226,723

(22) Filed: Jul. 26, 2023

(65) Prior Publication Data

US 2024/0040529 A1      Feb. 1, 2024

(30) Foreign Application Priority Data

Jul. 29, 2022      (JP) ................................. 2022-122111

(51) Int. Cl.
*H04W 60/00*      (2009.01)
*H04W 8/02*      (2009.01)
(52) U.S. Cl.
CPC ............. *H04W 60/00* (2013.01); *H04W 8/02* (2013.01)
(58) Field of Classification Search
CPC ....... H04W 60/00; H04W 8/02; H04W 28/02; H04W 28/0273; H04W 28/0284; H04W 28/06; H04W 68/00
See application file for complete search history.

(56) References Cited

U.S. PATENT DOCUMENTS

| | | | | |
|---|---|---|---|---|
| 11,743,763 | B2 * | 8/2023 | Papa ................. | H04W 28/0289 370/230 |
| 11,751,121 | B2 * | 9/2023 | Zhang ................... | H04W 48/06 370/328 |
| 12,289,662 | B2 * | 4/2025 | Lanev ................. | H04L 41/5019 |

(Continued)

FOREIGN PATENT DOCUMENTS

| | | |
|---|---|---|
| JP | 2013-187747 A | 9/2013 |
| JP | WO2013/133191 A1 | 7/2015 |

(Continued)

OTHER PUBLICATIONS

JP Office Action for JP Application No. 2022-122111, mailed on Mar. 31, 2026 with English Translation.

*Primary Examiner* — Khawar Iqbal
(74) *Attorney, Agent, or Firm* — Sughrue Mion, PLLC

(57)      ABSTRACT

Provided is a technique to prevent, in disaster roaming, deterioration in service for subscribers of a telecommunications carrier that operates a mobile network. A notification section (21) notifies a base station apparatus (1) of a maximum number of acceptable subscribers for each roaming requester telecommunications carrier. A determination section (12) permits a new connection request from a terminal apparatus in a case where the new connection request is a connection request from a subscriber terminal of a host telecommunications carrier that provides a roaming service, and determines, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

11 Claims, 8 Drawing Sheets

(56) References Cited

U.S. PATENT DOCUMENTS

| 12,375,987 | B2 * | 7/2025 | Watfa ....................... H04W 4/90 |
| 2014/0148165 | A1 | 5/2014 | Serravalle et al. |
| 2014/0198740 | A1 * | 7/2014 | Shinojima .............. H04L 5/003 |
| | | | 370/329 |
| 2015/0103649 | A1 | 4/2015 | Yasuoka et al. |
| 2022/0295260 | A1 * | 9/2022 | Yamine ................... H04W 8/00 |
| 2023/0370964 | A1 * | 11/2023 | Chaponniere ......... H04W 48/18 |
| 2024/0236718 | A9 * | 7/2024 | Aghili ................... H04W 36/24 |
| 2025/0031029 | A1 * | 1/2025 | Mariyani ................ H04W 8/20 |
| 2025/0098027 | A1 * | 3/2025 | Ianev ...................... H04W 76/38 |
| 2025/0113216 | A1 * | 4/2025 | Foti ....................... H04W 60/00 |
| 2025/0351109 | A1 * | 11/2025 | Youn ....................... H04W 8/06 |

FOREIGN PATENT DOCUMENTS

| JP | 2017-201841 | A | 11/2017 |
| JP | 2020-025213 | A | 2/2020 |
| JP | 2022-511312 | A | 1/2022 |
| WO | 2022/149846 | A1 | 7/2022 |

* cited by examiner

FIG. 5

COMMUNICATION SYSTEM, COMMUNICATION CONTROL APPARATUS, AND COMMUNICATION CONTROL METHOD

This Nonprovisional application claims priority under U.S.C. § 119 on Patent Application No. 2022-122111 filed in Japan on Jul. 29, 2022, the entire contents of which are hereby incorporated by reference.

TECHNICAL FIELD

The present invention relates to a communication system, a communication control apparatus, and a communication control method.

BACKGROUND ART

In recent years, mobile networks have become important infrastructures and, for example, the influence of disasters on the services is increasing. Generally, several telecommunications carriers provide mobile radio access network (RAN) services in the same area. A subscriber has contracted with a particular telecommunications carrier and can only use a mobile network that is operated by the particular telecommunications carrier.

Meanwhile, a method has been considered in which, in a case of failure of a mobile network operated by a telecommunications carrier, the service can be continued to be received by using a mobile network of another telecommunications carrier. In particular, it has become possible to use, in a case of a disaster, roaming (disaster roaming) in a mobile network that is operated by another telecommunications carrier.

However, the number of terminals which would roam from other telecommunications carriers is not taken into account when a base station is designed. Therefore, there are concerns that congestion and connection regulation occur in a case where there are connections in an amount greater than the number acceptable to a system due to roaming from another telecommunications carrier, and a service for subscribers of a telecommunications carrier that operates the mobile network is deteriorated. As a related technology, there is an invention disclosed in Patent Literature 1 below.

Patent Literature 1 indicates that, when a single public land mobile network (PLMN) has reached a maximum granted resource, an evolved node B (eNB) blocks a further connection request from user equipment (UE) belonging to the PLMN.

CITATION LIST

Patent Literature

[Patent Literature 1]
Japanese Patent Application Publication Tokukai No. 2017-201841

SUMMARY OF INVENTION

Technical Problem

According to Patent Literature 1, when a single PLMN has reached a maximum granted resource, an eNB can block a further connection request from UE belonging to the PLMN. However, in disaster roaming, control is not carried out while distinguishing between (i) subscribers of the telecommunications carrier that operates the mobile network and (ii) subscribers of other telecommunications carriers. Therefore, it is impossible to prevent deterioration in service for subscribers of the telecommunications carrier that operates the mobile network.

An example aspect of the present invention is accomplished in view of the above problems, and its example object is to provide a technique for preventing, in disaster roaming, deterioration in service for subscribers of a telecommunications carrier that operates a mobile network.

Solution to Problem

A communication system according to an example aspect of the present invention includes: base station apparatuses; and a communication control apparatus that provides a roaming service in disaster roaming, the communication control apparatus including at least one first processor, the at least one first processor carrying out a storage process of storing, for each of the base station apparatuses, a maximum number of acceptable subscribers for each of roaming requester telecommunications carriers that receive the roaming service, and a notification process of notifying the base station apparatus of the maximum number of acceptable subscribers for each of the roaming requester telecommunications carriers, each of the base station apparatuses including at least one second processor, the at least one second processor carrying out a reception process of receiving the maximum number of acceptable subscribers for each of the roaming requester telecommunications carriers from the communication control apparatus, a permission process of permitting a new connection request from a terminal apparatus in a case where the new connection request is a connection request from a subscriber terminal of a host telecommunications carrier that provides the roaming service, and a determination process of determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

A communication control apparatus according to an example aspect of the present invention is a communication control apparatus for controlling provision of a roaming service in disaster roaming, the communication control apparatus including at least one processor, the at least one processor carrying out: a storage process of storing, for each of base station apparatuses, a maximum number of acceptable subscribers for each of roaming requester telecommunications carriers which receive the roaming service; and a notification process of notifying the base station apparatus of the maximum number of acceptable subscribers for each of the roaming requester telecommunications carriers.

A communication control method according to an example aspect of the present invention is a communication control method in a communication system including base station apparatuses and a communication control apparatus that provides a roaming service in disaster roaming, the communication control method including: storing a maximum number of acceptable subscribers for each of roaming requester telecommunications carriers that receive the roaming service; notifying the base station apparatus of the maximum number of acceptable subscribers for each of the roaming requester telecommunications carriers; permitting a new connection request from a terminal apparatus in a case where the new connection request is a connection request from a subscriber terminal of a host telecommunications carrier that provides the roaming service; and determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

Advantageous Effects of Invention

According to an example aspect of the present invention, it is possible to prevent, in disaster roaming, deterioration in service for subscribers of a telecommunications carrier that operates a mobile network.

BRIEF DESCRIPTION OF DRAWINGS

FIG. 5 is a block diagram illustrating a configuration example of a communication system according to a second example embodiment of the present invention.

EXAMPLE EMBODIMENTS

First Example Embodiment

Overview of Invention

Figure 1:
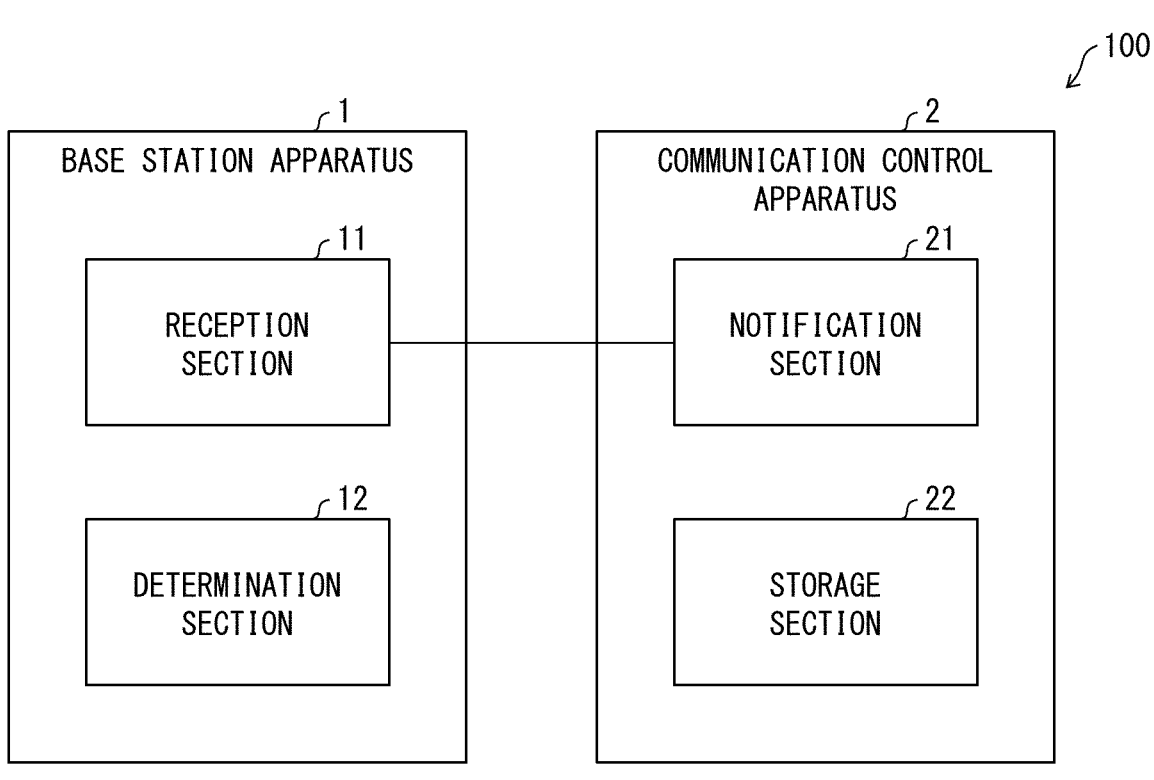
FIG. 1 is a block diagram illustrating a configuration example of a communication system according to a first example embodiment of the present invention.

It has become possible to use, in a case of a disaster, roaming (disaster roaming) in a mobile network (hereinafter, referred to as a communication system) that is operated by another telecommunications carrier. Roaming means that a service of a contracted telecommunications carrier can be received, even outside the service provision range of the telecommunications carrier, by using facilities of another telecommunications carrier that is in alliance with the contracted telecommunications carrier. Disaster roaming means that, in a case where a service of a contracted telecommunications carrier cannot be received due to a disaster or the like, the service can be received by using facilities of another telecommunications carrier that is in alliance with the contracted telecommunications carrier.

However, in a case where the number of terminals which would roam from other telecommunications carriers is not taken into account when a base station is designed, there are concerns that congestion and connection regulation occur in a case where there are connections in an amount greater than the number acceptable to a system due to roaming from another telecommunications carrier, and a service for subscribers of a telecommunications carrier that operates the mobile network is deteriorated.

The communication system according to the present example embodiment restricts only a connection of a roaming requester telecommunications carrier which receives a roaming service, and makes it possible to accept subscribers of another telecommunications carrier while inhibiting influence on subscribers of a host telecommunications carrier that provides the roaming service. Note that the roaming requester refers to a side that receives the roaming service.

<Communication System 100 According to First Example Embodiment>

The following description will discuss a first example embodiment of the present invention in detail with reference to the drawings. The present example embodiment is a basic form of example embodiments described later. Note that reference signs which are indicated in the drawings and are used in this overview are given to elements for convenience as an example for assisting in understanding, and are not intended to limit the present invention to the illustrated aspects. The connection lines between blocks in the drawings and the like referred to in the descriptions below include both a bidirectional relation and a unidirectional relation. The one-way arrow schematically indicates a flow of a main signal (data), and does not exclude bidirectionality. The connection point of an input and an output of each of the blocks in the drawings may be configured to include a port or an interface. The configurations of these are not illustrated.

FIG. 1 is a block diagram illustrating a configuration example of a communication system 100 according to the first example embodiment of the present invention. The communication system 100 according to the present example embodiment is a communication system for providing a roaming service in disaster roaming, and includes a base station apparatus 1 and a communication control apparatus 2 as illustrated in FIG. 1. The base station apparatus 1 includes a reception section 11 and a determination section 12. The communication control apparatus 2 includes a notification section 21 and a storage section 22.

The communication system 100 is a fifth-generation mobile communication system (5G), a fourth-generation mobile communication system (4G), a local 5G, a local 4G, or the like that is defined by the third-generation mobile communication system partnership project (3GPP).

The storage section 22 of the communication control apparatus 2 stores a maximum number of acceptable subscribers for each roaming requester telecommunications carrier that receives a roaming service. The maximum number of acceptable subscribers for each roaming requester telecommunications carrier is stored in the storage section 22 for each base station.

The roaming requester telecommunications carrier is a telecommunications carrier that has become unable to provide a service by its own mobile network due to a disaster or the like, and receives provision of a roaming service from another telecommunications carrier. The host telecommunications carrier is a telecommunications carrier capable of providing a service by its own mobile network even in a case of a disaster or the like, and provides a roaming service to another telecommunications carrier.

The maximum number of acceptable subscribers is a maximum value of the number of subscribers of a roaming requester telecommunications carrier that can be accepted by a communication system operated by the host telecommunications carrier in disaster roaming. In a case where there are a plurality of roaming requester telecommunications carriers, the maximum number of acceptable subscribers is set for each of the roaming requester telecommunications carriers.

The notification section 21 of the communication control apparatus 2 notifies the base station apparatus 1 of the maximum number of acceptable subscribers for each roaming requester telecommunications carrier. In a case where the communication system 100 is, for example, a 5G defined by the 3GPP, the notification section 21 notifies the base station apparatus 1 of the maximum number of acceptable subscribers via an interface N2 between a next generation node B (gNB) which is the base station apparatus 1 and an access and mobility function (AMF) which is the communication control apparatus 2.

The reception section 11 of the base station apparatus 1 receives, from the communication control apparatus 2, the maximum number of acceptable subscribers for each roaming requester telecommunications carrier. In a case where the communication system 100 is, for example, a 5G defined by the 3GPP, the reception section 11 receives, from the communication control apparatus 2, a maximum number of acceptable subscribers via an interface N2 between a gNB which is the base station apparatus 1 and an AMF which is the communication control apparatus 2.

The determination section 12 of the base station apparatus 1 permits a new connection request from a terminal apparatus in a case where the new connection request is a connection request from a subscriber terminal of the host telecommunications carrier. With the configuration, the communication system 100 can prevent deterioration in service for subscribers of the host telecommunications carrier without restricting new connection requests from subscriber terminals of the host telecommunications carrier even in a case of disaster roaming.

The determination section 12 determines, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

For example, in a case where the number of connections of subscriber terminals of a roaming requester telecommunications carrier does not exceed a corresponding maximum number of acceptable subscribers due to a new connection request from a subscriber terminal of the roaming requester telecommunications carrier, the determination section 12 permits the new connection request.

Meanwhile, in a case where the number of connections of subscriber terminals of a roaming requester telecommunications carrier exceeds a corresponding maximum number of acceptable subscribers due to a new connection request from a subscriber terminal of the roaming requester telecommunications carrier, the determination section 12 rejects the new connection request. With the configuration, in disaster roaming, the communication system 100 can restrict only new connection requests from subscriber terminals of a roaming requester telecommunications carrier.

(Example Advantage of Communication System 100)

As described above, according to the communication system 100 of the present example embodiment, the determination section 12 permits a new connection request from a terminal apparatus in a case where the new connection request is a connection request from a subscriber terminal of the host telecommunications carrier. Therefore, it is possible to prevent deterioration in service for subscribers of the host telecommunications carrier without restricting new connection requests from subscriber terminals of the host telecommunications carrier even in a case of disaster roaming.

The determination section 12 determines, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier. Therefore, in disaster roaming, it is possible to restrict only new connection requests from subscriber terminals of a roaming requester telecommunications carrier.

<Flow of Processing Method by Communication System 100>

Figure 2:
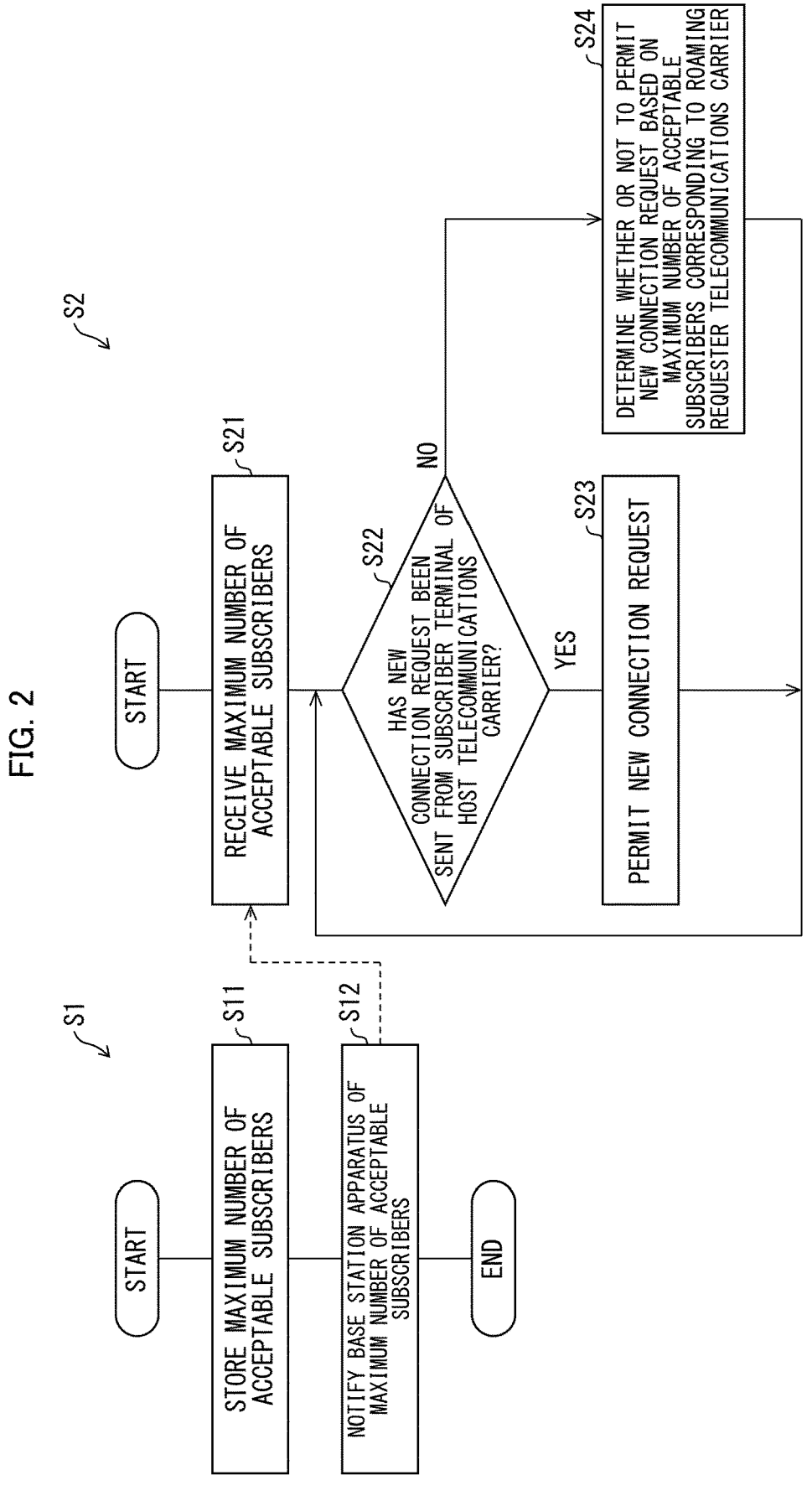
FIG. 2 is a flowchart illustrating a flow of a processing method of the communication system according to the first example embodiment of the present invention.

The following description will discuss a flow of a processing method that is carried out by the communication system 100 configured as described above, with reference to FIG. 2. FIG. 2 is a flowchart illustrating the flow of the processing method of the communication system 100 according to the first example embodiment. As illustrated in FIG. 2, a processing method S1 is mainly a processing procedure of the communication control apparatus 2, and includes steps S11 and S12. A processing method S2 is mainly a processing procedure of the base station apparatus 1, and includes steps S21 through S24.

First, the storage section 22 of the communication control apparatus 2 stores a maximum number of acceptable subscribers for each roaming requester telecommunications carrier that receives a roaming service (S11). The maximum number of acceptable subscribers is a maximum value of the number of subscribers of a roaming requester telecommunications carrier that can be accepted by a communication system operated by the host telecommunications carrier in disaster roaming.

Next, the notification section 21 of the communication control apparatus 2 notifies the base station apparatus 1 of the maximum number of acceptable subscribers for each roaming requester telecommunications carrier (S12). The notification section 21 notifies, for example, the base station apparatus 1 of the maximum number of acceptable subscribers via the interface N2 in the 5G.

Next, the reception section 11 of the base station apparatus 1 receives, from the communication control apparatus 2, the maximum number of acceptable subscribers for each roaming requester telecommunications carrier (S21). The reception section 11 receives, for example, the maximum number of acceptable subscribers from the communication control apparatus 2 via the interface N2 in the 5G.

Next, the determination section 12 of the base station apparatus 1 determines whether or not a new connection request from a terminal apparatus is a connection request from a subscriber terminal of the host telecommunications carrier that provides the roaming service (S22). In a case where the new connection request from the terminal apparatus is a connection request from a subscriber terminal of the host telecommunications carrier that provides the roaming service (Yes in S22), the determination section 12 permits the new connection request (S23), and repeats the processes in and subsequent to step S22.

Meanwhile, in a case where a new connection request of a terminal apparatus is not a connection request from a subscriber terminal of the host telecommunications carrier that provides the roaming service (No in S22), that is, in a case where a new connection request from a terminal apparatus is a connection request from a subscriber terminal of a roaming requester telecommunications carrier, the determination section 12 determines whether or not to permit the new connection request based on a maximum number of acceptable subscribers corresponding to the roaming requester telecommunications carrier (S24).

For example, in a case where the number of connections of subscriber terminals of a roaming requester telecommunications carrier does not exceed a corresponding maximum number of acceptable subscribers due to a new connection request from a subscriber terminal of the roaming requester telecommunications carrier, the new connection request is permitted.

Meanwhile, in a case where the number of connections of subscriber terminals of a roaming requester telecommunications carrier exceeds a corresponding maximum number of acceptable subscribers due to a new connection request from a subscriber terminal of the roaming requester telecommunications carrier, the new connection request is rejected.

<Example Advantage of Processing Method by Communication System 100>

As described above, according to the processing method by the communication system 100 of the present example embodiment, the determination section 12 permits a new connection request from a terminal apparatus in a case where the new connection request is a connection request from a subscriber terminal of the host telecommunications carrier. Therefore, it is possible to prevent deterioration in service for subscribers of the host telecommunications carrier without restricting new connection requests from subscriber terminals of the host telecommunications carrier even in a case of disaster roaming.

The determination section 12 determines, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier. Therefore, in disaster roaming, it is possible to restrict only new connection requests from subscriber terminals of a roaming requester telecommunications carrier.

<Communication Control Apparatus 2 According to First Example Embodiment>

Figure 3:
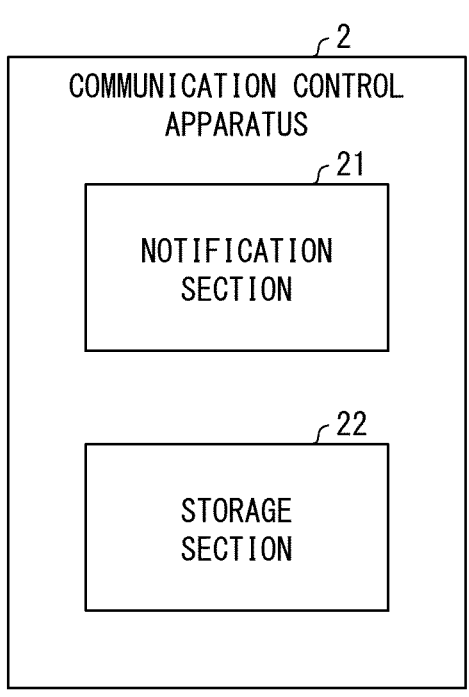
FIG. 3 is a block diagram illustrating a configuration example of a communication control apparatus according to the first example embodiment of the present invention.

FIG. 3 is a block diagram illustrating a configuration example of the communication control apparatus 2 according to the first example embodiment of the present invention. The communication control apparatus 2 according to the present example embodiment is a communication control apparatus for controlling provision of a roaming service in disaster roaming, and includes the notification section 21 and the storage section 22 as illustrated in FIG. 3.

The storage section 22 stores a maximum number of acceptable subscribers for each roaming requester telecommunications carrier that receives a roaming service. The notification section 21 notifies a base station of the maximum number of acceptable subscribers for each roaming requester telecommunications carrier.

<Base Station Apparatus 1 According to First Example Embodiment>

Figure 4:
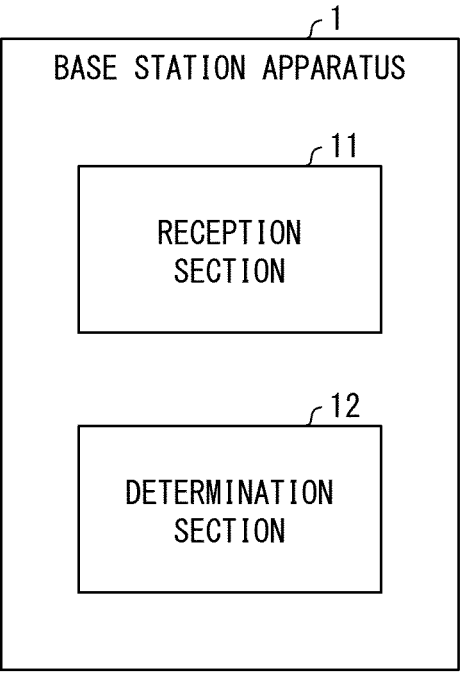
FIG. 4 is a block diagram illustrating a configuration example of a base station apparatus according to the first example embodiment of the present invention.

FIG. 4 is a block diagram illustrating a configuration example of the base station apparatus 1 according to the first example embodiment of the present invention. The base station apparatus 1 according to the present example embodiment is a base station apparatus for controlling provision of a roaming service in disaster roaming, and includes the reception section 11 and the determination section 12 as illustrated in FIG. 4.

The reception section 11 receives, from the communication control apparatus 2, the maximum number of acceptable subscribers for each roaming requester telecommunications carrier that receives the roaming service.

The determination section 12 permits a new connection request from a terminal apparatus in a case where the new connection request is a connection request from a subscriber terminal of a host telecommunications carrier that provides the roaming service, and determines, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

Second Example Embodiment

<Configuration Example of Communication System 100A According to Second Example Embodiment>

Figure 5:
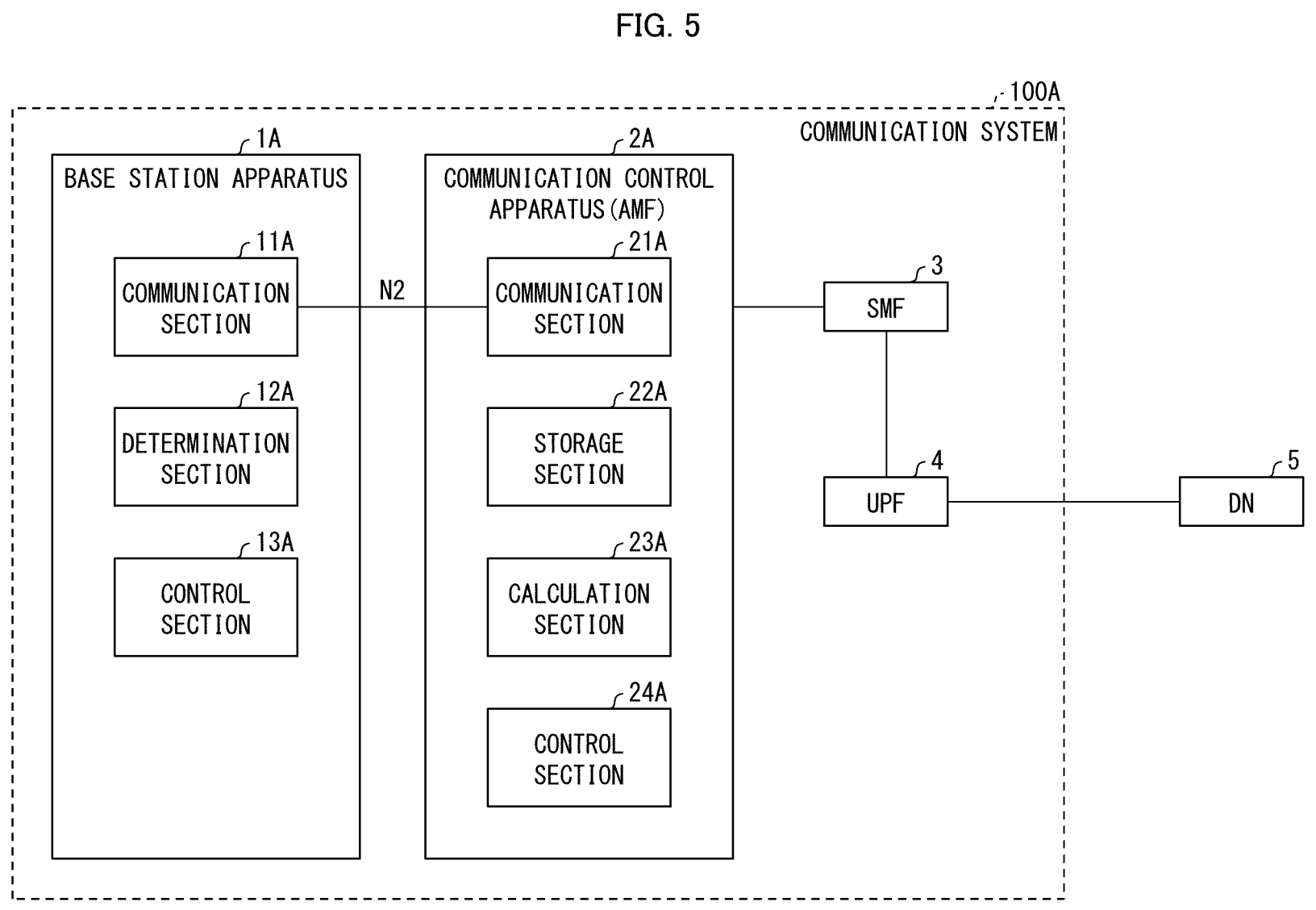

FIG. 5 is a diagram illustrating a configuration of a communication system 100A according to the second example embodiment of the present invention. The communication system 100A according to the present example embodiment includes a base station apparatus 1A, a communication control apparatus (AMF) 2A, a session management function (SMF) 3, and a user plane function (UPF) 4.

In a 5G core network (5GC), an architecture is employed in which processing is carried out while a control plane (C-Plane) for control signal communication such as communication establishment is separated from a user plane (U-Plane) for user data communication. The C-Plane includes the AMF 2A, the SMF 3, and the like. The U-Plane includes the UPF 4.

The AMF 2A is a network function (NF) that provides authentication, permission, mobility management, and the like of UE (terminal apparatus), and controls the SMF 3. The SMF 3 is an NF that is responsible for session management of the UE, assignment of IP addresses, selection and control of the UPF 4 for data transfer, and the like.

In a case where the UE establishes a plurality of sessions, the AMF 2A can assign different SMFs 3 to the respective sessions so that the SMFs 3 independently manage the sessions and use different functions for the respective sessions. In the 5GC, management related to the UE is carried out by a single AMF 2A, and traffic is handled by the SMF 3 for each individual network slice.

The UPF 4 is an NF that functions as an external protocol data unit (PDU) session point that interconnects with a data network (DN) 5, and carries out packet routing, forwarding, and the like.

The DN 5 is a data network external to the 5GC. The DN 5 includes a wide area network such as the Internet and a narrow area network such as a local area network (LAN).

The communication control apparatus (AMF) 2A includes a communication section 21A, a storage section 22A, a calculation section 23A, and a control section 24A. The communication section 21A is configured to realize the notification section in the present example embodiment. The storage section 22A is configured to realize the storage section in the present example embodiment. The calculation section 23A is configured to realize the calculation section in the present example embodiment.

The communication section 21A carries out, for example, communication with the base station apparatus 1A via the interface N2 in the 5G.

The storage section 22A is constituted by a non-volatile memory (such as a flash memory), a hard disk, or the like, and stores a maximum number of acceptable subscribers for each roaming requester telecommunications carrier that receives the roaming service.

The calculation section 23A calculates the maximum number of acceptable subscribers for each roaming requester telecommunications carrier from the number of acceptable subscribers for each base station, the number of subscribers to be accepted in roaming which is included in contract conditions between the host telecommunications carrier and the roaming requester telecommunications carrier, and the number of acceptable subscribers of a core network (AMF). Then, the calculation section 23A causes the storage section 22A to store the calculated maximum number of acceptable subscribers.

The communication control apparatus (AMF) 2A accommodates a plurality of base stations (gNB). For each of the base stations (gNB), the number of acceptable subscribers (or the number of acceptable connections) is determined. For example, the number of acceptable subscribers can be uniformly calculated by (the number of subscribers that can be accepted in an area of interest/the number of base stations in the area of interest). Alternatively, the number of acceptable subscribers may be calculated for each base station.

Contract conditions are defined between the host telecommunications carrier and the roaming requester telecommunications carrier. The contract conditions include the number of subscribers to be accepted in roaming. For example, the number of acceptable subscribers for each base station needs to satisfy the following formula 1.

> Number of acceptable subscribers for each base station>((Number of acceptable subscribers of roaming requester telecommunications carrier 1)+ . . . +(Number of acceptable subscribers of roaming requester telecommunications carrier $n$)/Number of base stations in area    Formula 1:

Moreover, the number of acceptable subscribers of the communication control apparatus (AMF) 2A needs to satisfy the following formula 2.

> Number of acceptable subscribers of communication control apparatus>Number of registered subscribers of host telecommunications carrier+ Total number of acceptable subscribers of plurality of roaming requester telecommunications carriers    Formula 2:

In a case where a resource capacity (processing performance) varies between the base stations (gNB), the number of acceptable subscribers for each base station (gNB) can be set in proportion to the resource capacity of the base station.

For example, the calculation section 23A may divide the number of acceptable subscribers for each base station according to a ratio between the numbers of subscribers to be accepted in roaming from respective roaming requester telecommunications carriers that are defined in the contract conditions, and allocate the divided portions to the respective roaming requester telecommunications carriers.

The control section 24A carries out comprehensive control of the communication control apparatus 2A and mainly realizes the above described functions of the AMF.

When starting acceptance of disaster roaming, the communication section 21A may notify the base station apparatus 1A of the maximum number of acceptable subscribers for each roaming requester telecommunications carrier that is stored in the storage section 22A.

The notification section 21A may provide a notification indicating a maximum number of acceptable subscribers for each roaming requester telecommunications carrier according to the number of new connection requests from subscriber terminals of the roaming requester telecommunications carrier.

In a case where the number of registered subscribers of a roaming requester telecommunications carrier exceeds a corresponding maximum number of acceptable subscribers due to a new connection request from a subscriber terminal of the roaming requester telecommunications carrier, the communication section 21A may notify the base station apparatus 1A of the maximum number of acceptable subscribers for each roaming requester telecommunications carrier.

For example, in a case where there is a registration request from a terminal apparatus via the base station apparatus 1A, the control section 24A determines a source of the registration request (i.e., to which telecommunications carrier the subscriber terminal which has sent the registration request belongs) based on a PLMN included in a message from the base station apparatus 1A. Then, the control section 24A counts the number of registered subscribers for each roaming requester telecommunications carrier, and in a case where there is a roaming requester telecommunications carrier in which the number of registrations exceeds the maximum number of acceptable subscribers, the control section 24A causes the communication section 21A to notify the base station apparatus 1A of the maximum number of acceptable subscribers for each roaming requester telecommunications carrier. At this time, the communication section 21A may notify the base station apparatus 1A of the number of registrations for each of current roaming requester telecommunications carriers.

The base station apparatus 1A includes a communication section 11A, a determination section 12A, and a control section 13A. The communication section 11A is configured to realize the reception section in the present example embodiment. The determination section 12A is configured to realize the determination section in the present example embodiment.

For example, the communication section 11A carries out communication with the communication control apparatus 2A via the interface N2 in the 5G, and receives, from the communication control apparatus 2A, the maximum number of acceptable subscribers for each roaming requester telecommunications carrier.

The control section 13A carries out comprehensive control of the base station apparatus 1A, and mainly realizes functions of a radio access network (RAN) defined by the 3GPP.

The determination section 12A permits a new connection request from a terminal apparatus in a case where the new connection request is a connection request from a subscriber terminal of the host telecommunications carrier. The determination section 12A determines, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

For example, in a case where the communication control apparatus 2A has started accepting disaster roaming, the communication section 11A receives, from the communication control apparatus 2A, the maximum number of acceptable subscribers for each roaming requester telecommunications carrier. The determination section 12A determines, based on a PLMN included in a message, a source of the new connection request (i.e., to which telecommunications carrier the subscriber terminal which has sent the connection request belongs). Then, the determination section 12A counts the number of connections for each roaming requester telecommunications carrier. In a case where the number of connections of subscriber terminals of the roaming requester telecommunications carrier does not exceed a corresponding maximum number of acceptable subscribers due to the new connection request from the subscriber terminal of the roaming requester telecommunications carrier, the determination section 12A permits the new connection request.

Meanwhile, in a case where the number of connections of subscriber terminals of the roaming requester telecommunications carrier exceeds a corresponding maximum number of acceptable subscribers due to the new connection request from the subscriber terminal of the roaming requester telecommunications carrier, the determination section 12A rejects the new connection request.

Figure 6:
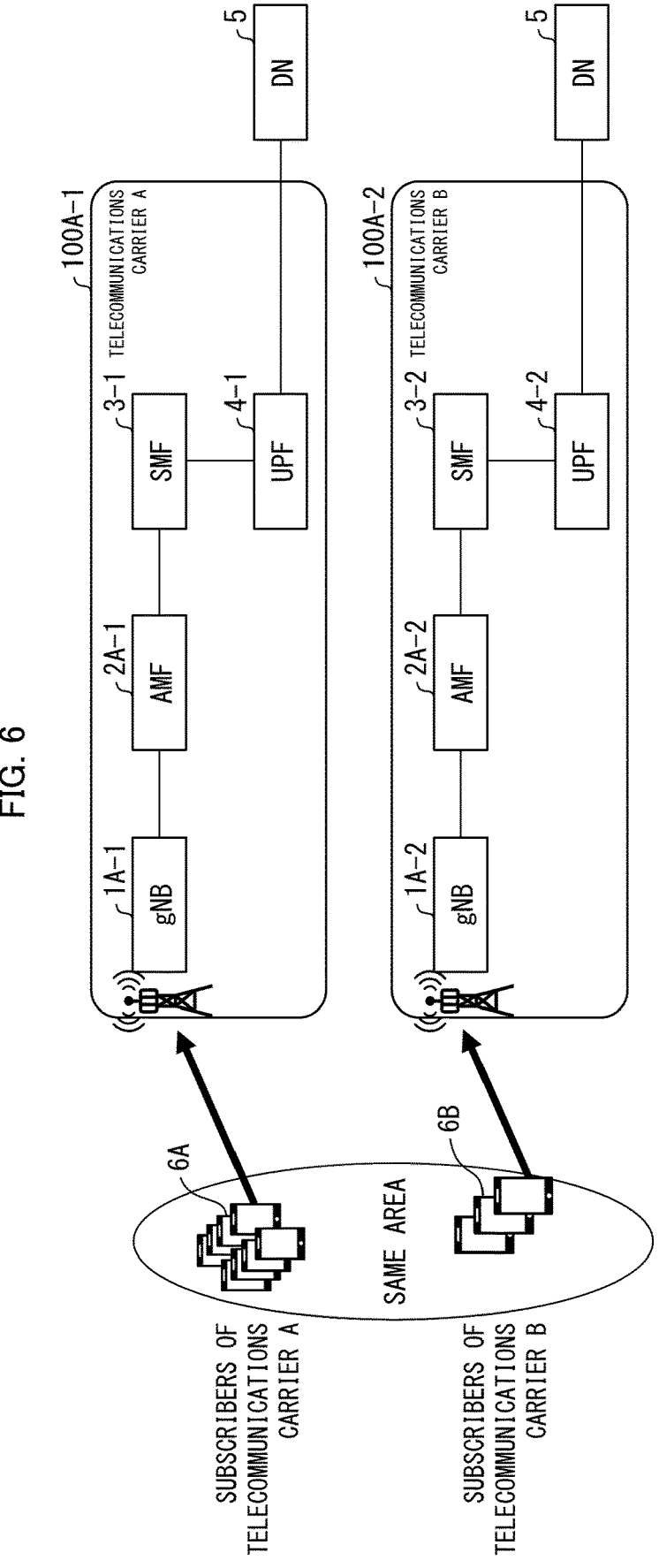
FIG. 6 is a diagram schematically illustrating an operation of a communication system in normal times.

FIG. 6 is a diagram schematically illustrating an operation of the communication system 100A in normal times. When a communication system 100A-1 that is operated by a telecommunications carrier A is normally operating, a subscriber terminal 6A of the telecommunications carrier A can receive a service from the communication system 100A-1.

Similarly, when a communication system 100A-2 that is operated by a telecommunications carrier B is normally operating, a subscriber terminal 6B of the telecommunications carrier B can receive a service from the communication system 100A-2.

Figure 7:
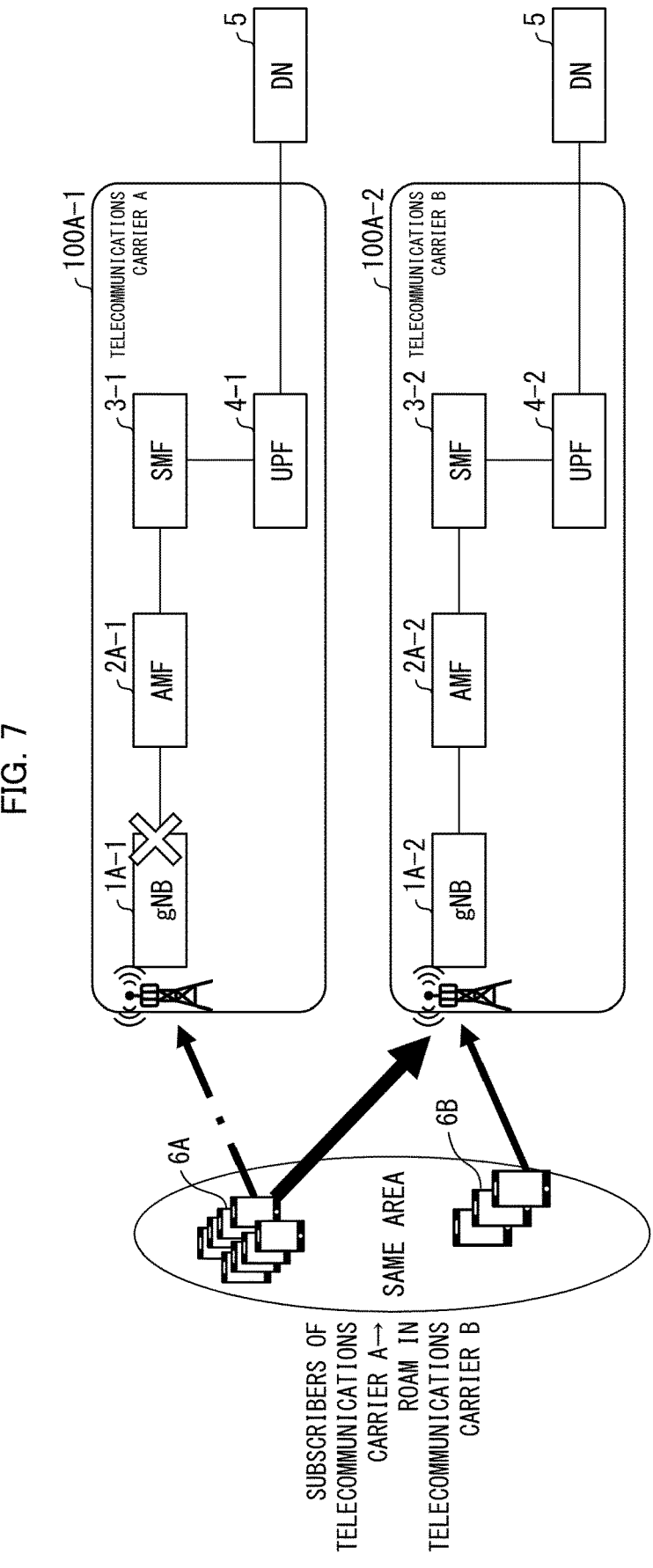
FIG. 7 is a diagram schematically illustrating an operation of a communication system in disaster roaming.

FIG. 7 is a diagram schematically illustrating an operation of a communication system in disaster roaming. FIG. 7 illustrates a case in which a disaster has occurred, an anomaly has occurred in the communication system 100A-1 that is operated by the telecommunications carrier A, and the subscriber terminal 6A of the telecommunications carrier A cannot receive a service from the communication system 100A-1.

Meanwhile, in a case where the communication system 100A-2 that is operated by the telecommunications carrier B is in a state in which the service can be provided even in the case of the disaster, disaster roaming is started. At this time, the subscriber terminal 6A of the telecommunications carrier A can receive a roaming service of the communication system 100A-2 that is operated by the telecommunications carrier B.

Figure 8:
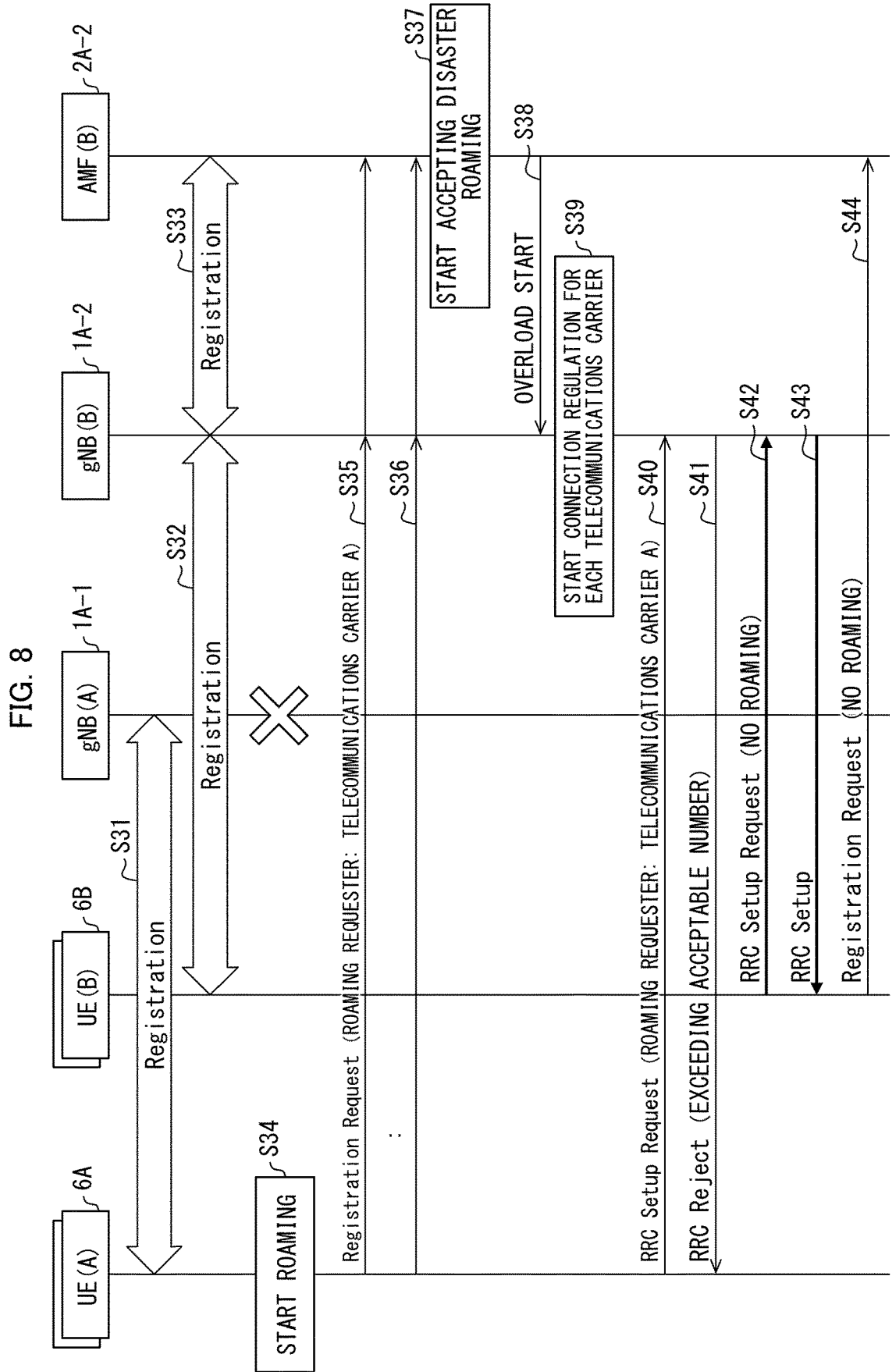
FIG. 8 is a sequence diagram illustrating a processing procedure of the communication system according to the second example embodiment of the present invention.

FIG. 8 is a sequence diagram illustrating a processing procedure of the communication system according to the second example embodiment of the present invention. First, a subscriber terminal (UE(A)) 6A of the telecommunications carrier A carries out "Registration" with a base station apparatus (gNB(A)) 1A-1 of the communication system 100A-1 that is operated by the telecommunications carrier A (S31). Moreover, a subscriber terminal (UE(B)) 6B of the telecommunications carrier B carries out "Registration" with a base station apparatus (gNB(B)) 1A-2 and a communication control apparatus (AMF(B)) 2A-2 of the communication system 100A-2 that is operated by the telecommunications carrier B (S32, S33).

Roaming is started in a case where a disaster has occurred, an anomaly has occurred in the communication system 100A-1 that is operated by the telecommunications carrier A, and the subscriber terminal 6A of the telecommunications carrier A cannot receive a service from the communication system 100A-1 (S34).

A plurality of subscriber terminals 6A issue "Registration Requests" to the communication control apparatus (AMF (B)) 2A-2 via the base station apparatus (gNB(B)) 1A-2 (S35, S36). At this time, the communication control apparatus (AMF(B)) 2A-2 has started accepting disaster roaming (S37), and notifies the base station apparatus (gNB(B)) 1A-2 of a congestion control start (OVERLOAD START) in an NG application protocol (NGAP) (S38).

Upon receipt of "OVERLOAD START" from the communication control apparatus (AMF(B)) 2A-2, the base station apparatus (gNB(B)) 1A-2 starts connection regulation for each roaming requester telecommunications carrier (S39). As described above, when the communication control apparatus (AMF(B)) 2A-2 has started accepting disaster roaming, the base station apparatus (gNB(B)) 1A-2 receives the maximum number of acceptable subscribers for each roaming requester telecommunications carrier from the communication control apparatus (AMF(B)) 2A-2.

The base station apparatus (gNB(B)) 1A-2 determines, based on a PLMN included in a message, a source of the new connection request (i.e., to which telecommunications carrier the subscriber terminal which has sent the connection request belongs). Then, the base station apparatus (gNB(B)) 1A-2 counts the number of connections for each roaming requester telecommunications carrier. In a case where the number of connections of subscriber terminals of the roaming requester telecommunications carrier does not exceed a corresponding maximum number of acceptable subscribers due to the new connection request from the subscriber terminal of the roaming requester telecommunications carrier, the base station apparatus (gNB(B)) 1A-2 permits the new connection request.

Meanwhile, in a case where the number of connections of subscriber terminals of the roaming requester telecommunications carrier exceeds a corresponding maximum number of acceptable subscribers due to the new connection request from the subscriber terminal of the roaming requester telecommunications carrier, the base station apparatus (gNB (B)) 1A-2 rejects the new connection request.

As illustrated in FIG. 8, when the base station apparatus (gNB(B)) 1A-2 has received a new connection request (RRC Setup Request) from the subscriber terminal (UE(A)) 6A of the telecommunications carrier A (S40), the base station apparatus (gNB(B)) 1A-2 determines whether or not the number of connections of subscriber terminals 6A of the telecommunications carrier A exceeds the maximum number of acceptable subscribers of the telecommunications carrier A.

In a case where the number of connections of subscriber terminals 6A of the telecommunications carrier A exceeds the maximum number of acceptable subscribers of the telecommunications carrier A (exceeding acceptable number), the base station apparatus (gNB(B)) 1A-2 transmits "RRC Reject" to the subscriber terminal (UE(A)) 6A to reject the new connection request (S41).

Meanwhile, when the base station apparatus (gNB(B)) 1A-2 has received a new connection request (RRC Setup Request) from the subscriber terminal (UE(B)) 6B of the telecommunications carrier B (S42), the base station apparatus (gNB(B)) 1A-2 permits the new connection request, and transmits "RRC Setup" to the subscriber terminal (UE (B)) 6B (S43).

Upon receipt of "RRC Setup" from the base station apparatus (gNB(B)) 1A-2, the subscriber terminal (UE(B))

6B issues "Registration Request" to the communication control apparatus (AMF(B)) 2A-2 (S44).

(Example Advantage of Communication System 100A)

As described above, according to the communication system 100A of the present example embodiment, in a case where the number of connections of subscriber terminals of a roaming requester telecommunications carrier exceeds a corresponding maximum number of acceptable subscribers due to a new connection request from a subscriber terminal of the roaming requester telecommunications carrier, the determination section 12A of the base station apparatus 1A rejects the new connection request. Therefore, the communication system 100A can restrict only new connection requests from subscriber terminals of a roaming requester telecommunications carrier, and prevent deterioration in service for subscribers of the host telecommunications carrier.

Moreover, when starting acceptance of disaster roaming, the communication section 21A of the communication control apparatus 2A notifies the base station apparatus 1A of the maximum number of acceptable subscribers for each roaming requester telecommunications carrier that is stored in the storage section 22A. Therefore, the communication control apparatus 2A can update the maximum number of acceptable subscribers for each roaming requester telecommunications carrier before starting acceptance of disaster roaming, and notify, when starting acceptance of disaster roaming, the base station apparatus 1A of the maximum number of acceptable subscribers in which the updated value is reflected.

In a case where the number of registered subscribers of a roaming requester telecommunications carrier exceeds a corresponding maximum number of acceptable subscribers due to a new connection request from a subscriber terminal of the roaming requester telecommunications carrier, the communication section 21A of the communication control apparatus 2A notifies the base station apparatus 1A of the maximum number of acceptable subscribers for each roaming requester telecommunications carrier. Therefore, the base station apparatus 1A does not need to count the number of connections of subscribers for each roaming requester telecommunications carrier during a period from when acceptance of disaster roaming is started to when a notification is received. This makes it possible to reduce a processing load.

Moreover, the calculation section 23A of the communication control apparatus 2A calculates the maximum number of acceptable subscribers for each roaming requester telecommunications carrier from the number of acceptable subscribers for each base station, the number of subscribers to be accepted in roaming which is included in contract conditions between the host telecommunications carrier and the roaming requester telecommunications carrier, and the number of acceptable subscribers of a core network (AMF). Therefore, in a case where there is a change in contract conditions between the host telecommunications carrier and the roaming requester telecommunications carrier, or the like, the calculation section 23A can easily reflect the content of change in the maximum number of acceptable subscribers.

[Software Implementation Example]

The functions of part of or all of the base station apparatuses 1 and 1A, the communication control apparatuses 2 and 2A, and the communication systems 100 and 100A can be realized by hardware such as an integrated circuit (IC chip) or can be alternatively realized by software.

Figure 9:
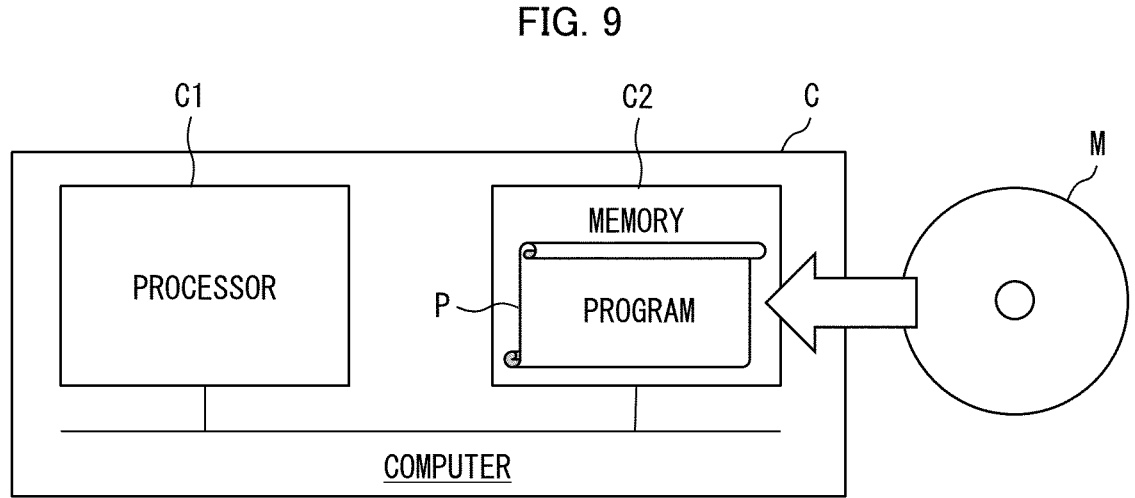
FIG. 9 is a block diagram illustrating a configuration of a computer that functions as a communication system, a base station apparatus, or a communication control apparatus according to each example embodiment.

In the latter case, each of the base station apparatuses 1 and 1A, the communication control apparatuses 2 and 2A, and the communication systems 100 and 100A is realized by, for example, a computer that executes instructions of a program that is software realizing the foregoing functions. FIG. 9 illustrates an example of such a computer (hereinafter, referred to as "computer C"). The computer C includes at least one processor C1 and at least one memory C2. The memory C2 stores a program P for causing the computer C to function as the base station apparatuses 1 and 1A, the communication control apparatuses 2 and 2A, and the communication systems 100 and 100A. In the computer C, the processor C1 reads the program P from the memory C2 and executes the program P, so that the functions of the base station apparatuses 1 and 1A, the communication control apparatuses 2 and 2A, and the communication systems 100 and 100A are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a RAM in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some of or all of the foregoing example embodiments can also be described as below. Note, however, that the present invention is not limited to the following supplementary notes.

Supplementary Note 1

A communication system including: a base station apparatus; and a communication control apparatus that provides a roaming service in disaster roaming, the communication control apparatus including a storage means that stores a maximum number of acceptable subscribers for each of roaming requester telecommunications carriers that receive the roaming service, and a notification means that notifies the base station apparatus of the maximum number of acceptable subscribers for each of the roaming requester telecommunications carriers, the base station apparatus including a reception means that receives the maximum number of acceptable subscribers for each of the roaming requester telecommunications carriers from the communication control apparatus, a permission means that permits a new connection request from a terminal apparatus in a case where the new connection request is a connection request from a subscriber terminal of a host telecommunications carrier that provides the roaming service, and a determination means of determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

According to the configuration, it is possible to prevent deterioration in service for subscribers of the host telecommunications carrier without restricting new connection requests from subscriber terminals of the host telecommunications carrier even in a case of disaster roaming.

Moreover, in disaster roaming, it is possible to restrict only new connection requests from subscriber terminals of a roaming requester telecommunications carrier.

Supplementary Note 2

The communication system according to supplementary note 1, in which: in a case where the number of connections of subscriber terminals of a roaming requester telecommunications carrier exceeds a corresponding maximum number of acceptable subscribers due to a new connection request from a subscriber terminal of the roaming requester telecommunications carrier, the determination means rejects the new connection request.

According to the configuration, it is possible to restrict only new connection requests from subscriber terminals of a roaming requester telecommunications carrier, and prevent deterioration in service for subscribers of the host telecommunications carrier.

Supplementary Note 3

The communication system according to supplementary note 1 or 2, in which: when starting acceptance of disaster roaming, the notification means provides a notification indicating the maximum number of acceptable subscribers for each of the roaming requester telecommunications carriers.

According to the configuration, it is possible to update the maximum number of acceptable subscribers for each of the roaming requester telecommunications carriers before starting acceptance of disaster roaming, and notify, when starting acceptance of disaster roaming, the base station apparatus of the maximum number of acceptable subscribers in which the updated value is reflected.

Supplementary Note 4

The communication system according to supplementary note 1 or 2, in which: the notification means provides a notification indicating the maximum number of acceptable subscribers for each of the roaming requester telecommunications carriers according to the number of new connection requests from subscriber terminals of the roaming requester telecommunications carrier.

According to the configuration, the base station apparatus does not need to count the number of connections of subscribers for each roaming requester telecommunications carrier during a period from when acceptance of disaster roaming is started to when a notification is received. This makes it possible to reduce a processing load.

Supplementary Note 5

The communication system according to any one of supplementary notes 1 through 4, further including: a calculation means that calculates the maximum number of acceptable subscribers for each of the roaming requester telecommunications carriers from the number of acceptable subscribers for each base station, the number of subscribers to be accepted in roaming which is included in contract conditions between the host telecommunications carrier and the roaming requester telecommunications carrier, and the number of acceptable subscribers of a core network.

According to the configuration, in a case where there is a change in contract conditions between the host telecommunications carrier and the roaming requester telecommunications carrier, or the like, the calculation means can easily reflect the content of change in the maximum number of acceptable subscribers.

Supplementary Note 6

A communication control apparatus for controlling provision of a roaming service in disaster roaming, the communication control apparatus including: a storage means that stores a maximum number of acceptable subscribers for each of roaming requester telecommunications carriers which receive the roaming service; and a notification means that notifies a base station of the maximum number of acceptable subscribers for each of the roaming requester telecommunications carriers.

According to the configuration, it is possible to update the maximum number of acceptable subscribers for each of the roaming requester telecommunications carriers, and notify, when starting acceptance of disaster roaming, the base station apparatus of the maximum number of acceptable subscribers in which the updated value is reflected.

Supplementary Note 7

A base station apparatus for controlling provision of a roaming service in disaster roaming, the base station apparatus including: a reception means that receives, from a communication control apparatus, a maximum number of acceptable subscribers for each of roaming requester telecommunications carriers that receive the roaming service; a permission means that permits a new connection request from a terminal apparatus in a case where the new connection request is a connection request from a subscriber terminal of a host telecommunications carrier that provides the roaming service; and a determination means that determines, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

According to the configuration, it is possible to prevent deterioration in service for subscribers of the host telecommunications carrier without restricting new connection requests from subscriber terminals of the host telecommunications carrier even in a case of disaster roaming.

Moreover, in disaster roaming, it is possible to restrict only new connection requests from subscriber terminals of a roaming requester telecommunications carrier.

Supplementary Note 8

A communication control method in a communication system including a base station apparatus and a communication control apparatus that provides a roaming service in disaster roaming, the communication control method including: storing a maximum number of acceptable subscribers for each of roaming requester telecommunications carriers that receive the roaming service; notifying the base station apparatus of the maximum number of acceptable subscribers for each of the roaming requester telecommunications carriers; permitting a new connection request from a terminal apparatus in a case where the new connection request is a connection request from a subscriber terminal of a host telecommunications carrier that provides the roaming service; and determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

According to the configuration, it is possible to prevent deterioration in service for subscribers of the host telecommunications carrier without restricting new connection requests from subscriber terminals of the host telecommunications carrier even in a case of disaster roaming.

Moreover, in disaster roaming, it is possible to restrict only new connection requests from subscriber terminals of a roaming requester telecommunications carrier.

Supplementary Note 9

A communication control method for controlling provision of a roaming service in disaster roaming, the communication control method including: storing a maximum number of acceptable subscribers for each of roaming requester telecommunications carriers which receive the roaming service; and notifying a base station of the maximum number of acceptable subscribers for each of the roaming requester telecommunications carriers.

According to the configuration, it is possible to update the maximum number of acceptable subscribers for each of the roaming requester telecommunications carriers, and notify, when starting acceptance of disaster roaming, the base station of the maximum number of acceptable subscribers in which the updated value is reflected.

Supplementary Note 10

A communication control method for controlling provision of a roaming service in disaster roaming, the communication control method including: receiving, from a communication control apparatus, a maximum number of acceptable subscribers for each of roaming requester telecommunications carriers that receive the roaming service; permitting a new connection request from a terminal apparatus in a case where the new connection request is a connection request from a subscriber terminal of a host telecommunications carrier that provides the roaming service; and determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

According to the configuration, it is possible to prevent deterioration in service for subscribers of the host telecommunications carrier without restricting new connection requests from subscriber terminals of the host telecommunications carrier even in a case of disaster roaming.

Moreover, in disaster roaming, it is possible to restrict only new connection requests from subscriber terminals of a roaming requester telecommunications carrier.

Supplementary Note 11

A communication system comprising a base station apparatus, a communication control apparatus that provides a roaming service in disaster roaming, and at least one processor, the at least one processor carrying out: a storage process of storing a maximum number of acceptable subscribers for each of roaming requester telecommunications carriers that receive the roaming service; a notification process of notifying the base station apparatus of the maximum number of acceptable subscribers for each of the roaming requester telecommunications carriers; a permission process of permitting a new connection request from a terminal apparatus in a case where the new connection request is a connection request from a subscriber terminal of a host telecommunications carrier that provides the roaming service; and a determination process of determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

Note that the communication system can further include a memory. The memory can store a program for causing the at least one processor to carry out the storage process, the notification process, the permission process, and the determination process. The program can be stored in a computer-readable non-transitory tangible storage medium.

Supplementary Note 12

A communication control apparatus for controlling provision of a roaming service in disaster roaming, the communication control apparatus including at least one processor, the at least one processor carrying out: a storage process of storing a maximum number of acceptable subscribers for each of roaming requester telecommunications carriers which receive the roaming service; and a notification process of notifying a base station of the maximum number of acceptable subscribers for each of the roaming requester telecommunications carriers.

Note that the communication control apparatus can further include a memory. The memory can store a program for causing the at least one processor to carry out the storage process and the notification process. The program can be stored in a computer-readable non-transitory tangible storage medium.

Supplementary Note 13

A base station apparatus for controlling provision of a roaming service in disaster roaming, the base station apparatus including at least one processor, the at least one processor carrying out: a reception process of receiving, from a communication control apparatus, a maximum number of acceptable subscribers for each of roaming requester telecommunications carriers that receive the roaming service; a permission process of permitting a new connection request from a terminal apparatus in a case where the new connection request is a connection request from a subscriber terminal of a host telecommunications carrier that provides the roaming service; and a determination process of determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier.

Note that the base station apparatus can further include a memory. The memory can store a program for causing the at least one processor to carry out the reception process, the permission process, and the determination process. The program can be stored in a computer-readable non-transitory tangible storage medium.

REFERENCE SIGNS LIST 1, 1A: Base station apparatus (gNB)
2, 2A: Communication control apparatus (AMF)
3: SMF
4: UPF
5: DN
11: Reception section
11A, 21A: Communication section
12: Determination section
12A: Determination section
13A, 24A: Control section
21: Notification section
22: Storage section
22A: Storage section
23A: Calculation section
100, 100A: Communication system

The invention claimed is:
1. A communication system comprising:
base station apparatuses; and
a communication control apparatus that provides a roaming service in disaster roaming,
the communication control apparatus including at least one first processor, the at least one first processor carrying out
a storage process of storing, for each of the base station apparatuses, a maximum number of acceptable subscribers for each of roaming requester telecommunications carriers that receive the roaming service, and
a notification process of notifying the base station apparatus of the maximum number of acceptable subscribers for each of the roaming requester telecommunications carriers,
each of the base station apparatuses including at least one second processor, the at least one second processor carrying out
a reception process of receiving the maximum number of acceptable subscribers for each of the roaming requester telecommunications carriers from the communication control apparatus,
a permission process of permitting a new connection request from a terminal apparatus in a case where the new connection request is a connection request from a subscriber terminal of a host telecommunications carrier that provides the roaming service,
a determination process of determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier, and
a calculation process of calculating the maximum number of acceptable subscribers for each of the roaming requester telecommunications carriers from a number of acceptable subscribers for each of the base station apparatuses, a number of subscribers to be accepted in roaming which is included in contract conditions between the host telecommunications carrier and the roaming requester telecommunications carrier, and the number of acceptable subscribers of a core network, and storing the maximum number of acceptable subscribers which has been calculated,
wherein the maximum number of acceptable subscribers is a maximum value of the number of subscribers of the roaming requester telecommunications carrier that is configured to be accepted by a communication system operated by the host telecommunications carrier in the disaster roaming.
2. The communication system according to claim 1, wherein:
in the determination process, in a case where the number of connections of subscriber terminals of a roaming requester telecommunications carrier exceeds a corresponding maximum number of acceptable subscribers due to a new connection request from a subscriber terminal of the roaming requester telecommunications carrier, the at least one second processor rejects the new connection request.
3. The communication system according to claim 1, wherein:
in the notification process, when starting acceptance of disaster roaming, the at least one first processor provides a notification indicating the maximum number of acceptable subscribers for each of the roaming requester telecommunications carriers.
4. The communication system according to claim 1, wherein:
in the notification process, the at least one first processor provides a notification indicating the maximum number of acceptable subscribers for each of the roaming requester telecommunications carriers according to the number of new connection requests from subscriber terminals of the roaming requester telecommunications carrier.
5. A communication control apparatus for controlling provision of a roaming service in disaster roaming, said communication control apparatus comprising at least one processor, the at least one processor carrying out:
a storage process of storing, for each of base station apparatuses, a maximum number of acceptable subscribers for each of roaming requester telecommunications carriers which receive the roaming service;

a notification process of notifying the base station apparatus of the maximum number of acceptable subscribers for each of the roaming requester telecommunications carriers; and a calculation process of calculating the maximum number of acceptable subscribers for each of the roaming requester telecommunications carriers from a number of acceptable subscribers for each of the base station apparatuses, a number of subscribers to be accepted in roaming which is included in contract conditions between the host telecommunications carrier and the roaming requester telecommunications carrier, and the number of acceptable subscribers of a core network, and storing the maximum number of acceptable subscribers which has been calculated, wherein the maximum number of acceptable subscribers is a maximum value of the number of subscribers of the roaming requester telecommunications carrier that is configured to be accepted by a communication system operated by the host telecommunications carrier in the disaster roaming.

6. The communication control apparatus according to claim 5, wherein:

in the notification process, when starting acceptance of disaster roaming, the at least one processor provides a notification indicating the maximum number of acceptable subscribers for each of the roaming requester telecommunications carriers.

7. The communication control apparatus according to claim 5, wherein:

in the notification process, the at least one processor provides a notification indicating the maximum number of acceptable subscribers for each of the roaming requester telecommunications carriers according to the number of new connection requests from subscriber terminals of the roaming requester telecommunications carrier.

8. A communication control method in a communication system including base station apparatuses and a communication control apparatus that provides a roaming service in disaster roaming, said communication control method comprising:

storing a maximum number of acceptable subscribers for each of roaming requester telecommunications carriers that receive the roaming service;

notifying the base station apparatus of the maximum number of acceptable subscribers for each of the roaming requester telecommunications carriers;

permitting a new connection request from a terminal apparatus in a case where the new connection request is a connection request from a subscriber terminal of a host telecommunications carrier that provides the roaming service;

determining, in a case where a new connection request from a terminal apparatus is a connection request from a subscriber terminal of a roaming requester telecommunications carrier, whether or not to permit the new connection request based on a maximum number of acceptable subscribers corresponding to the roaming requester telecommunications carrier;

calculating the maximum number of acceptable subscribers for each of the roaming requester telecommunications carriers from a number of acceptable subscribers for each of the base station apparatuses, a number of subscribers to be accepted in roaming which is included in contract conditions between the host telecommunications carrier and the roaming requester telecommunications carrier, and the number of acceptable subscribers of a core network; and storing the maximum number of acceptable subscribers which has been calculated, wherein the maximum number of acceptable subscribers is a maximum value of the number of subscribers of the roaming requester telecommunications carrier that can is configured to be accepted by a communication system operated by the host telecommunications carrier in the disaster roaming.

9. The communication control method according to claim 8, wherein:

in the determining, in a case where the number of connections of subscriber terminals of a roaming requester telecommunications carrier exceeds a corresponding maximum number of acceptable subscribers due to a new connection request from a subscriber terminal of the roaming requester telecommunications carrier, the new connection request is rejected.

10. The communication control method according to claim 8, wherein:

in the notifying, when starting acceptance of disaster roaming, a notification indicating the maximum number of acceptable subscribers for each of the roaming requester telecommunications carriers is provided.

11. The communication control method according to claim 8, wherein:

in the notifying, a notification indicating the maximum number of acceptable subscribers for each of the roaming requester telecommunications carriers is provided according to the number of new connection requests from subscriber terminals of the roaming requester telecommunications carrier.

* * * * *